United States Patent

Saikatsu et al.

Patent Number: 5,961,711
Date of Patent: Oct. 5, 1999

[54] PIGMENT DISPERSANT, PIGMENT DISPERSION, AND PIGMENT DISPERSION FOR COLOR FILTER

[75] Inventors: Hiroaki Saikatsu; Hisao Okamoto; Mitsuo Yamazaki; Shigeru Sakamoto; Shiro Yamamiya; Yoshio Abe; Michiei Nakamura, all of Tokyo, Japan

[73] Assignee: Dainichiseika Color & Chemicals Mfg. Co., Ltd., Tokyo, Japan

[21] Appl. No.: 08/980,822

[22] Filed: Dec. 1, 1997

[30] Foreign Application Priority Data

Dec. 16, 1996 [JP] Japan ............................ 8-352568

[51] Int. Cl.$^6$ ........................ C07D 251/00; G02B 5/20
[52] U.S. Cl. ........................ 106/498; 430/7; 430/322; 544/187; 544/188
[58] Field of Search ........................ 106/498; 544/187, 544/188; 430/7, 322

[56] References Cited

U.S. PATENT DOCUMENTS

| | | | |
|---|---|---|---|
| 3,262,933 | 7/1966 | Mix et al. | 544/187 |
| 3,282,940 | 11/1966 | Weber et al. | 544/187 |
| 3,297,695 | 1/1967 | Weidinger et al. | 544/187 |
| 3,300,491 | 1/1967 | Jenny et al. | 544/187 |
| 3,349,089 | 10/1967 | Kazankov et al. | 544/187 |
| 3,470,178 | 9/1969 | Neef et al. | 544/187 |
| 3,488,349 | 1/1970 | Neef | 544/187 |
| 3,684,808 | 8/1972 | Ulrich | 544/187 |
| 4,098,793 | 7/1978 | Ribaldone et al. | 106/498 |
| 4,442,287 | 4/1984 | Hartwig | 544/187 |
| 5,368,976 | 11/1994 | Tajima et al. | 430/7 |
| 5,731,110 | 3/1998 | Hishiro et al. | 430/7 |
| 5,811,219 | 9/1998 | No et al. | 430/7 |
| 5,827,626 | 10/1998 | Kobayashi et al. | 430/7 |
| 5,853,924 | 12/1998 | Uwami et al. | 430/7 |
| 5,863,678 | 1/1999 | Urano et al. | 430/7 |

*Primary Examiner*—Anthony Green
*Attorney, Agent, or Firm*—Oblon, Spivak, McClelland, Maier & Neustadt, P.C.

[57] ABSTRACT

Disclosed is a pigment dispersant represented by the following formula (1):

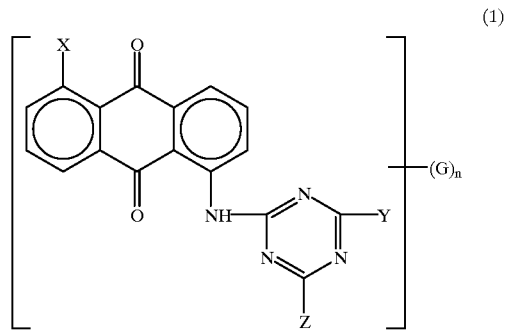

wherein X represents a hydrogen atom or an acylamino group; Y represents a specific aromatic group; Z represents a specific aromatic group or a $C_{2-30}$ aliphatic, alicyclic or hetero-alicyclic amine reaction residual group having at least one amino group; G represents a reaction residual group of at least one compound selected from $C_{2-30}$ aliphatic, alicyclic and hetero-alicyclic hydrocarbons each of which has at least one amino group; n is an integer of from 0 to 3; and when N stands for O, Z represents a reaction residual group of a $C_{2-30}$ aliphatic, alicyclic or hetero-alicyclic polyamine having at least two amino groups. A pigment dispersion making use of the dispersant and a color filter produced from the pigment dispersion are also disclosed.

13 Claims, No Drawings

PIGMENT DISPERSANT, PIGMENT DISPERSION, AND PIGMENT DISPERSION FOR COLOR FILTER

FIELD OF THE INVENTION

This invention relates to a pigment dispersant and also a pigment dispersion, and more specifically to a pigment dispersion excellent in fluidity and storage stability and especially suitable for the production of color filters.

DESCRIPTION OF THE RELATED ART

A color filter, which is useful for the production of a liquid crystal color display, an image pickup device or the like, has conventionally been produced primarily by spin-coating a color filter substrate with a pigment dispersion for the color filter—said pigment dispersion containing pigments of three colors, that is, red (R), green (G) and blue (B) dispersed in a solution of a photosensitive resin—to form a color film, exposing the color film to light through a photomask, and then developing the exposed color film to form the color film into a pattern so that desired pixels are formed.

As primary pigments for use in the production of color filters, phthalocyanin green, for example, C.I. Pigment Green (hereinafter called "P.G.") 36 is generally used as a green color, and anthraquinone red, for example, C.I. Pigment Red (hereinafter called "P.R.") 177 is generally employed as a red color. There are however differences in color characteristics between the hues of these pigments and color characteristics required for liquid crystal displays, so that for both the colors, a yellow pigment is also used in combination in a small amount as a complementary color.

As a film-forming resin in the pigment dispersion for the color filters, an acrylic resin having an acid value high enough to permit development with an alkaline aqueous solution is mainly adopted. However, in a pigment dispersion formed of the above-described conventional pigments and the acrylic resin of the high acid value, coagulation of the pigments takes place so that the viscosity of the pigment dispersion tends to become higher with time. The pigment dispersion therefore has poor storage stability in many instances. When a color filter is produced by a process which makes use of the pigment dispersion accompanied by such difficulties as described above, the pigment dispersion is coated on a color filter substrate by spin-coating. If the viscosity of the pigment dispersion is high or if pigment particles in the dispersion undergoes flocculation and the pigment dispersion exhibits thixotropic viscosity, a coating formulation becomes thicker around a central portion of the substrate. This leads to occurrence of unevenness in color hue and differences in density between a color film on the central part and that on a peripheral part of the substrate upon production of a large-screen color filter.

Accordingly, a pigment dispersion for color filters must be in such a dispersion state as being free from mutual flocculation of its pigment particles and must have a low viscosity of from 5 to 20 centipoises viscosity and excellent storage stability, despite its pigment content is generally in a range of from 5 to 10 wt. %. With a view to overcoming these problems, it is disclosed in Japanese Patent Applications Laid-Open (Kokai) Nos. SHO 60-237403 and SHO 60-247603 that addition of a derivative of a phthalocyanine blue pigment to a green pigment or a derivative of an anthanthrone pigment to a red pigment as a dispersant for the pigment can prevent flocculation of the pigment and can obtain a uniform pigment dispersion.

However, phthalocyanine green which is used primarily as a green color for color filters results in a pigment dispersion reduced substantially in viscosity when the derivative of the phthalocyanine blue pigment is added as a dispersant to the dispersion, although the resultant pigment dispersion has excellent storage stability. As the above-described derivative of the phthalocyanine blue pigment generally has a blue color, the addition of the derivative is accompanied by a drawback in that the maximum absorption wavelength at green pixels in a color filter is caused to shift toward a lower wavelength side, light transmitted therethrough becomes more bluish and a color display so formed is low in color quality as a color display for use in a liquid crystal display. For the yellow pigment used as a complementary color for a green color, the phthalocyanine blue pigment is not found to have significant dispersing effects.

SUMMARY OF THE INVENTION

To develop a pigment derivative (dispersant) capable of solving the above-described drawback of the conventional pigment derivative as a dispersant, the present inventors have proceeded with an extensive investigation. As a result, it has been found that a particular anthraquinonylaminotriazine compound commonly acts as an excellent dispersant for both the phthalocyanine green as a primary pigment for a green color and the yellow pigment as a complementary pigment therefor and can achieve a reduction in the viscosity of a pigment dispersion, that the resultant pigment dispersion is prevented from thickening and gelatinization during storage and has been improved in clarity most important for color filters, and that surprisingly, the particular anthraquinonylaminotriazine compound also exhibits considerable dispersing effects for the anthraquinone red (P.R. 177) and pyrropyrrole pigments (P.R. 254, P.O. 71) as primary pigments for a red color, leading to the completion of the present invention.

The present invention therefore provides a pigment dispersant represented by the following formula (1), a pigment dispersion for a color filter, said dispersion making use of the dispersant, a process for the production of a color filter, and a color filter obtained by the process.

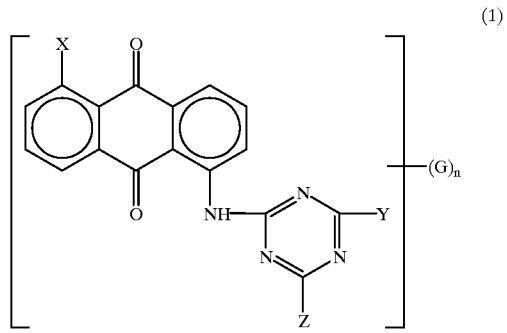

wherein X represents a hydrogen atom or an acylamino group; Y represents an anthraquinonylamino group having a hydrogen atom or an acylamino group at the 5-position thereof, a phenylamino group or a phenoxy group; Z represents an anthraquinonylamino group having a hydrogen atom or an acylamino group at the 5-position thereof, a phenylamino group, a phenoxy group or a $C_{2-30}$ aliphatic, alicyclic or hetero-alicyclic amine reaction residual group having at least one amino group; G represents a reaction residual group of at least one compound selected from $C_{2-30}$ aliphatic, alicyclic and heteroalicyclic hydrocarbons each of which has at least one amino group; n is an integer of from 0 to 3; and when N stands for O, Z represents a reaction residual group of a $C_{2-30}$ aliphatic, alicyclic or heteroalicyclic polyamine having at least two amino groups.

According to the present invention, the addition and use of the dispersant of this invention as a dispersant in pigments dispersions for the formation of an R color pattern and a G color pattern in a color filter makes it possible to prepare the pigment dispersions stably. Further, the eventual use of the pigment dispersions as pigment dispersions for the color filter results in color films excellent in spectral curve characteristics, high in vividness and brightness, high in clarity, and also superb in various fastness such as light fastness, heat resistance, solvent resistance, chemical resistance and waterproofness. Therefore, color patterns can be obtained with these excellent characteristics.

DETAILED DESCRIPTION OF THE INVENTION AND PREFERRED EMBODIMENTS

The pigment dispersant according to the present invention is useful as a dispersant for a variety of pigments known to date, and is useful as a dispersant for diverse pigments employed as coloring agents in various paints, printing inks, pigment printing agents and synthetic resins. It is particularly useful as a dispersant in pigment dispersions for color filters. The present invention will hereinafter be described taking, as a typical example, a pigment dispersion for color filters.

The use of the anthraquinonylaminotriazine compound, which is represented by the formula (1), as a dispersant for a pigment in the pigment dispersion according to the present invention for color filters has made it possible to prevent flocculation of particles of the pigment in the pigment dispersion. The structural viscosity of the pigment dispersion is therefore lowered, whereby low viscosity is exhibited. As a result, the thickening and gelatinization of the pigment dispersion are suppressed, leading to an increase in storage stability.

The dispersant of the formula (1) according to the present invention has a yellow, orange yellow or brown color and, when added to a green pigment dispersion making use of phthalocyanine green as a principal pigment of the pigment dispersion, shifts the maximum absorption wavelength of the green pigment to a longer wavelength side, so that pixels of desired color quality can be formed when employed in a color filter for a liquid crystal display or the like.

When added to a red pigment dispersion making use of the anthraquinone red (P.R. 177) as a principal pigment, the above-described dispersant is considered to be strongly adsorbed on surfaces of the anthraquinone red pigment owing to the possession of the anthraquinone structure, whereby alkylamino group(s) introduced in the dispersant appears to develop a strong affinity to free carboxylic groups in a film-forming resin dissolved in the pigment dispersion to impart liquid medium compatibility to the pigment and also to prevent flocculation-of the pigment owing to effects of the dispersant such as steric hindrance.

The present invention will next be described in further detail on the basis of certain preferred embodiments.

Pigment dispersants according to the present invention can be roughly classified into two groups, one having 0 as n and the other having 1 to 3 as n, both, in the formula (1). The pigment dispersants according to the present invention in which n is 0 are represented by the following formula (A):

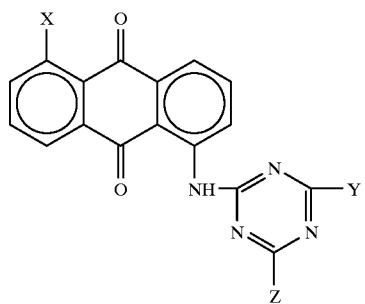

wherein X, Y and X have the same meanings as defined above.

The above-described pigment dispersions according to the present invention can be obtained, for example, by reacting 1 mole of 1-aminoanthraquinone, 1 mole of aniline or phenol and 1 mole of cyanuric chloride at 130° C. to 160° C. for 2 to 6 hours in an inert solvent such as o-dichlorobenzene, adding 1 mole of a polyamine having at least two amino groups, and then reacting the resultant mixture at 150 to 170° C. for 3 to 4 hours.

Examples of the polyamine, which has at least two amino groups and is useful in the above-described process, can include N,N-dimethylaminomethylamine, N,N-diethylaminomethylamine, N,N-dipropylaminomethylamine, N,N-dibutylaminomethylamine, N,N-dimethylaminoethylamine, N,N-diethylaminoethylamine, N,N-dipropylaminoethylamine, N,N-dibutylaminoethylamine, N,N-dimethylaminopropylamine, N,N-diethylaminopropylamine, N,N-dipropylaminopropylamine, N,N-dimethylaminobutylamine, N,N-diethylaminobutylamine, N,N-dipropylaminobutylamine, N,N-dibutylaminobutylamine, N,N-dimethylaminolaurylamine, N,N-diethylaminolaurylamine, N,N-dibutylaminolaurylamine, N,N-dimethylaminostearylamine, N,N-diethylaminostearylamine, N,N-diethanolaminoethylamine, N,N-diethanolaminopropylamine, N-aminopropylmorpholine, N-aminopropyl-4-pipecoline, N-aminopropylpiperidine, N,N-diethylaminoethoxypropylamine, N,N,N",N"-tetraethyldiethylenetriamine. Of these polyamines, preferred are those represented by the following structural formula:

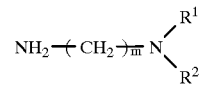

wherein $R^1$ and $R^2$ each independently represents a substituted or unsubstituted alkyl or cycloalkyl group or $R^1$ and $R^2$, together with the adjacent nitrogen atom, may form a heteroring optionally containing one or more nitrogen, oxygen or sulfur atoms, and m stands for an integer of from 2 to 30.

Specific examples of the dispersants (A) according to the present invention, which can be obtained following the above-described process, can include 2,4-bis[anthraquinonyl(-1')-amino]-6-(N,N-dimethylamino)-ethylamino-s-triazine, 2,4-bis[anthraquinonyl(-1')-amino]-6-(N,N-diethylamino)propylamino-s-triazine, 2,4-bis[5'-benzamidanthraquinonyl(-1')-amino-6-(N,N- dibutylamino)-s-triazine, 2,4-bis[5'-benzamidanthraquinonyl(-1')-amino]-6-(N,N-dimethylamino)ethylamino-s-triazine, 2,4-bis[anthraquinonyl(-1')-amino]-6-(N,N-dihydroxyethylamino)propylamino-s-triazine, 2,4-bis[5'-benzamidanthraquinonyl(-1')-amino]-6-(N,N-diethylamino)propylamino-s-triazine, 2,4-bis[anthraquinonyl(-1')-amino]-6-(N,N-dimethylaminoethoxy)propylamino-s-triazine, 2,4-bis[5'-benzamidanthraquinonyl(-1')-amino]-6-butylamino-s-triazine, 2-[anthraquinonyl(-1')-amino]-4-phenoxy-6-(N,N-diethylamino)propylamino-s-triazine, 2-mono[anthraquinonyl(-1')-amino]-4-phenylamino-6-(N,N-diethylamino)propylamino-s-triazine, 2-mono[5'-benzamidanthraquinonyl(1'-)-amino]-4-phenylamino-6-(N,N-diethylamino)propylamino-s-triazine, 2,4-bis[anthraquinonyl(-1')-amino]-6-(n-morpholinyl)ethylamino-s-triazine, 2,4-bis[anthraquinonyl(-1')-amino]-6-(N-piperidyl)propylamino-s-triazine, and 2,4-bis[anthraquinonyl(-1')-amino]-6-[(N,N-diethylamino)-phenyl(-1",4")-amino]-s-triazine.

The pigment dispersants according to the present invention in which n is 1 to 3 in the formula (1) are represented by the following formula (B):

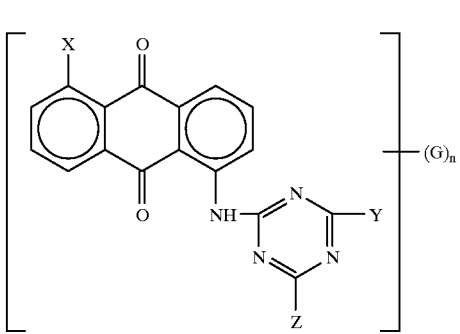

(B)

wherein X, Y, Z, G and n have the same meanings as defined above.

Examples of anthraquinonylaminotriazine compounds (yellow pigments) as raw materials for the dispersants (B) in the present invention can include, in addition of the above-exemplified dispersants (A), 2,4,6-tris[anthraquinonyl(-1')-amino]-s-triazine, 2,4,6-tris[5'-benzamidanthraquinonyl(-1')-amino]-s-triazine, 2,4-bis[anthraquinonyl(-1')-amino]-6-phenylamino-s-triazine, 2,4-bis[5'-benzamidanthraquinonyl(-1')-amino]-6-phenylamino-s-triazine, 2,4-bis[anthraquinonyl(-1')-amino]-6-phenoxy-s-triazine, 2,4-bis[5'-benzamidanthraquinonyl(-1')-amino]-6-phenoxy-s-triazine, 2,4-bis[anthraquinonyl(-1')-amino]-6-phenyl-s-triazine, 2,4-bis[5'-benzamidanthraquinonyl(-1')-amino]-6-phenyl-s-triazine, 2-mono[anthraquinonyl(-1')-amino]-4,6-bis(phenylamino)-s-triazine, 2-mono[5'-benzamidanthraquinonyl(-1')-amino]-4,6-bis(phenylamino)-s-triazine, 2,4-bis[anthraquinonyl(-1')-amino]-6-(N,N-dimethylamino)ethylamino-s-triazine, 2,4-bis[anthraquinonyl(-1')-amino]-6-(N,N-diethylamino)propylamino-s-triazine.

The above-exemplified anthraquinonylaminotriazine compounds can be produced, for example, by the production process disclosed in Japanese Patent Publications (Kokoku) Nos. SHO 46-33232, SHO 46-33233 and SHO 46-34518 or similar processes. Upon production, reactions are carried out, for example, by heating 1 to 3 moles of 1-aminoanthraquinone and 1 mole of cyanuric chloride in a solvent such as phenol at 110° C. for 5 hours and then at 150° C. for 2 to 3 hours and subsequent to addition of 0 to 2 moles of another primary amine and a phenol, heating the resulting reaction mixture at 150° C. for 2 to 3 hours.

Concerning the synthesis of the dispersants (B), a description will be made about one example. The above-described anthraquinonylaminotriazine compound to be used as a raw material is dissolved in concentrated sulfuric acid, fuming sulfuric acid or polyphosphoric acid, to which paraformaldehyde and a monochloroacetamide are reacted to obtain a compound represented by the below-described formula (b). Examples of the monochloroacetamide usable in this reaction can include monochloroacetamide, N-methyl-monochloroacetamide, N-ethyl-monochloroacetamide, 3-chloropropionamide, N-methyl-3-chloropropionamide, and N-ethyl-3-chloropropionamide.

As another process, the anthraquinonylaminotriazine compound as a raw material is added to a mixed solution of concentrated sulfuric acid or fuming sulfuric acid and chlorosulfonic acid, followed by the addition of paraformaldehyde to conduct a chloromethylation reaction so that a compound represented by the below-described formula (b) is obtained. As an alternative, the compound represented by the formula (b) can also be obtained by reacting phosphorus oxychloride to the compound represented by the formula (a) in the presence of dimethylformamide or the like.

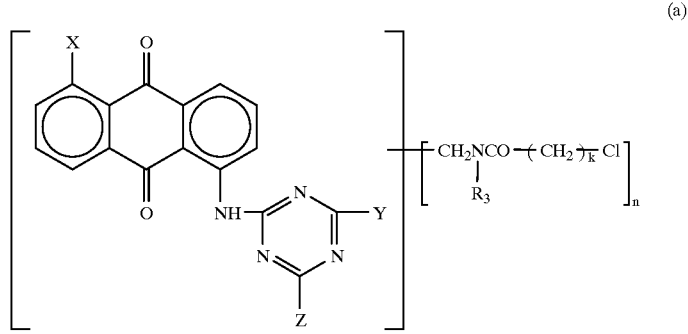

(a)

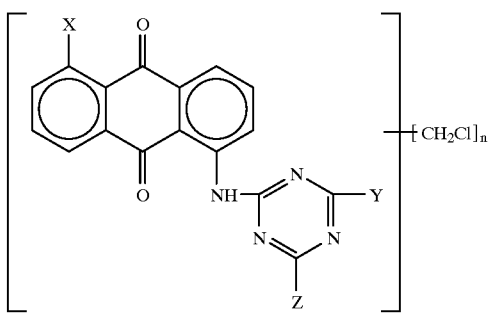

(b)

wherein X, Y, Z and n have the same meanings as defined above, $R^3$ represents a hydrogen atom or a lower alkyl group, and k stands for an integer of 1 or 2.

The compound represented by the formula (a) or (b) is next reacted, in water or an inert solvent, with at least one amino compound selected from $C_{2-30}$ aliphatic, alicyclic and heteroalicyclic hydrocarbons having at least one amino group, whereby a dispersant of the present invention represented by the formula (c) or (d) is synthesized.

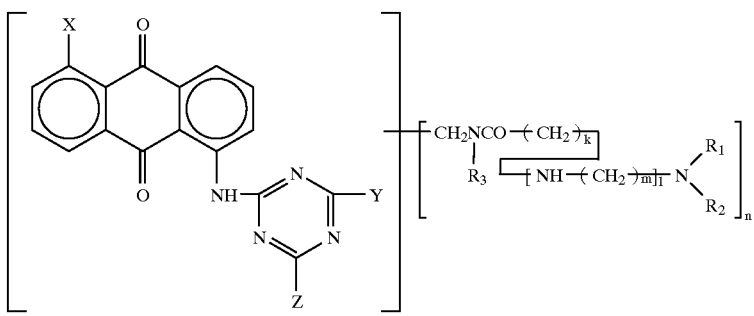

(c)

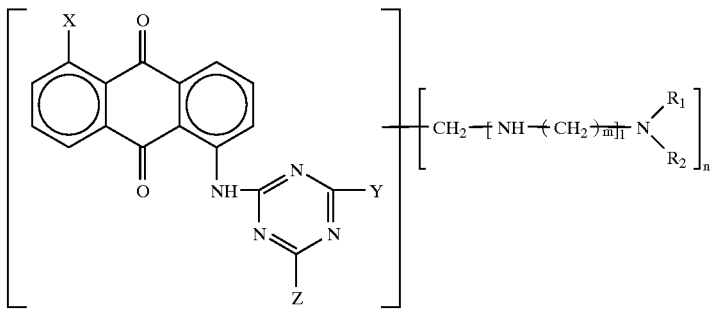

(d)

wherein X, Y, Z, $R^1$, $R^2$, $R^3$, k and n has the same meanings as defined above, m stands for an integer of from 2 to 30, and l stands for an integer of 0 or 1.

To obtain the dispersant of this invention represented by the formula (c) or (d), an amino compound having a primary or secondary amino group is reacted to the compound of the formula (a) or (b). The reaction between the compound of the formula (a) or (b) and such an amino compound is conducted by heating the compound of the formula (a) or (b) in the presence of an excess amount of the amino compound in water or an inert solvent at 50 to 150° C. for several hours. As the amino compound for use in the reaction, a known primary or secondary monoamine selected from $C_{2-30}$ aliphatic, alicyclic and heteroalicyclic hydrocarbons can be used, but a preferred amine is the above-described polyamine used employed for the production of the dispersant (A).

Groups preferred as the substituent group G in the dispersant (B) according to the present invention are the following groups:

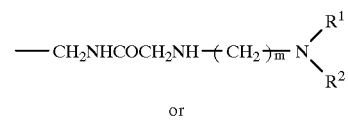

or

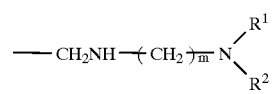

wherein $R^1$, $R^2$ and m have the same meanings as defined above.

To prepare a pigment dispersion by using the pigment dispersant according to the present invention, the pigment dispersant according to the present invention is used in a proportion of from 0.5 to 50 parts by weight, preferably from 1 to 30 parts by weight per 100 parts by weight of a pigment. The effects of the pigment dispersant according to the present are not recognized practically if it is used in an amount smaller than 0.5 part by weight, but, even if it is used in an amount greater than 50 parts by weight, its effects cannot be brought about as much as the amount used.

As a method for preparing the pigment dispersion according to the present invention, a pigment and a dispersant are added in and premixed with an organic solvent solution or aqueous solution containing an appropriate film-forming resin, and subsequent to mixing, the resultant mixture is subjected to dispersion treatment. For example, the pigment and dispersant are evenly mixed and ground in a disperser such as a tumbler, Henschel mixer, hammer mill, pin mill, kneader, attritor or ball mill. The mixture so obtained is thereafter added in and mixed with a solution containing the film-forming resin. As an alternative, the pigment is uniformly suspended in water or an organic solvent. A solution containing the dispersant is added to and mixed with the suspension. The pigment particles with the dispersant adsorbed thereon is added in and mixed with a solution containing the film-forming resin. As another alternative, the pigment and dispersant are dissolved in sulfuric acid or the like and subsequent to that, the sulfuric acid solution is caused to crystallized in water to separate them as a solid solution. The solid solution is added in and mixed with a solution containing the film-forming resin.

As the solution containing the film-forming resin for dispersing the pigment into the pigment dispersion in the present invention, a solution containing the film-forming resin, said solution being used in conventionally-known pigment dispersions for color filters, is used. As the solution medium, an organic solvent, water, or a mixture of an organic solvent and water is used. Further, conventionally-known additives, for example, additives such as a dispersing aid, a smoothing agent and an adhering agent can be added to the pigment dispersion.

The weight proportion of the pigment relative to the film-forming resin in the solution containing the film-forming resin may preferably be in a range of from 5 parts by weight to 500 parts by weight per 100 parts by weight of the film-forming resin. As the solution with the film-forming resin contained therein, either a solution containing a photosensitive film-forming resin or a solution containing a non-photosensitive film-forming resin can be used. Examples of the solution containing the photosensitive film-forming resin can include solutions containing photosensitive film-forming resins which are usable in ultraviolet curing inks and electron radiation curing inks, respectively. Illustrative of the solution containing the non-photosensitive film-forming resin can be varnishes for use in printing inks such as letterpress inks, lithographic inks, intaglio gravure inks and stencil screen inks, varnishes for use in room-temperature curing paints and baking paints, varnishes for use in electrodeposition coating, varnishes for use in developers for electronic printing and electrostatic printing, and varnishes for use in thermal transfer ribbons.

Illustrative photosensitive film-forming resins can include photosensitive cyclizing ribbon resins, photosensitive phenol resins, photosensitive polyacrylate resins, photosensitive polyamide resins and photosensitive polyimide resins, as well as unsaturated polyester resins, polyester acrylate resins, polyepoxy acrylate resins, polyurethane acrylate resins, polyether acrylate resins and polyol acrylate resins. Further, various monomers can also be added as reactive extenders. Preferred resins out of the above-described photosensitive film-forming resins are alkali-developable acrylate resins each of which contains free carboxylic groups in its molecule.

Further, a photo-curing, photosensitive pigment dispersion can be formed by adding a photopolymerization initiator such as benzoin ether or benzophenone to a pigment dispersion containing a photosensitive resin and then kneading the resultant mixture by a conventionally-known method. A heat-curing pigment dispersion can also be obtained by using a thermal polymerization initiator instead of the above-mentioned photopolymerization initiator.

To form a color filter pattern with the above-described photosensitive pigment dispersion, it is necessary to conduct full coating on a transparent color filter substrate such as a glass substrate with photosensitive pigment dispersion by means of a spin coater, low-speed rotating coater, roll coater, knife coater or the like or as an alternative, to perform full printing or partial printing for a size somewhat greater than the pattern by one of various printing methods. Subsequent to provisional drying, a photomask is brought into close contact with the thus-formed film, which is then subjected to exposure by using an extra-high pressure mercury vapor lamp to bake the pattern. Development and washing are then conducted and if necessary, post-baking is performed, whereby the color filter pattern can be formed.

Examples of the non-photosensitive film-forming resin can include cellulose acetate resins, nitrocellulose resins, styrene (co)polymers, polyvinyl butyral resins, aminoalkyd resins, rosin-modified phenol resins, polymerized linseed oil, petroleum resins, polyester resins, amino-resin-modified polyester resins, polyurethane resins, acrylic polyolurethane resins, soluble polyamide resins, soluble polyimide resins, soluble polyamide-imide resins, soluble polyester-imide resins, casein, hydroxyethylcellulose, water-soluble salts of styrene-maleic acid ester copolymers, water-soluble (meth) acrylic acid ester (co)polymers, water-soluble aminoalkyd resins, water-soluble aminopolyester resins, and water-soluble polyamide resins.

To form a color filter patter with the above-described non-photosensitive pigment dispersion, a few methods can be mentioned by way of example. Namely, the color pattern can be printed directed on a similar color filter substrate with the above-described non-photosensitive pigment dispersion, for example, a printing ink for the color filter by one of the above-described various printing methods. The color pattern can also be formed on the substrate with a water-base, electrodeposition coating formulation for the color filter. It is also possible to form the color pattern on a transfer base material beforehand by electron printing, electrostatic printing, one of the above-described methods or the like and then to transfer the color pattern onto a color filter substrate.

Baking, surface-smoothing grinding and/or surface-protecting top coating are then conducted, as needed, by conventional methods. It is also possible to obtain a RGB color filter by forming a black matrix in a conventional manner.

The present invention will next be described more specifically on the basis of synthesis examples, examples and comparative examples, in which all designations of "part" or "parts" and "%" are by weight.

EXAMPLES DIRECTED TO DISPERSANTS A

Synthesis Example A1

To 1,000 parts of o-dichlorobenzene, 71 pats of 1-aminoanthraquinone and 30 parts of cyanuric chloride were added, followed by stirring at 170° C. for 5 hours. After cooling, 50 parts of N,N-dimethylaminopropylamine were also added, followed by stirring at 170° C. for 3 hours. Subsequent to filtration, the solid matter was washed with alcohol and then dried, whereby 86 parts of Dispersant A1 of the following formula were obtained.

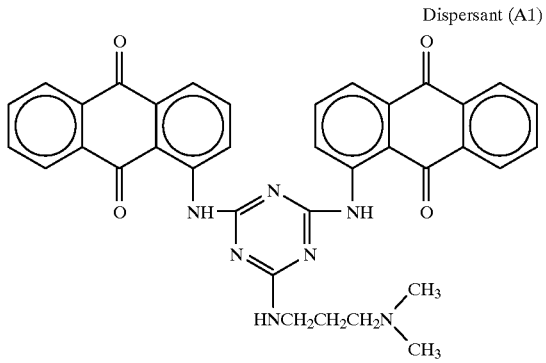

Dispersant (A1)

Synthesis Example A2

In a similar manner as in Synthesis Example A1, 1-aminoanthraquinone, aniline and N,N-dimethylaminopropylamine were successively reacted to cyanuric chloride, whereby Dispersant A2 of the following formula was obtained.

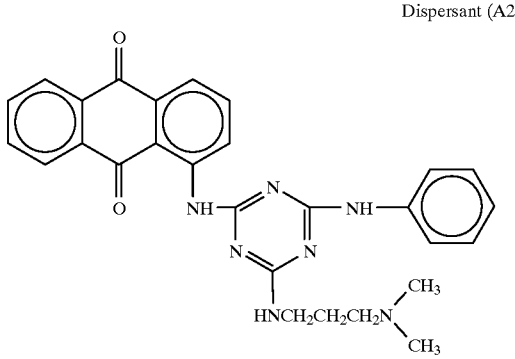

Dispersant (A2)

Synthesis Example A3

In a similar manner as in Synthesis Example A1, 5-benzamido-1-aminoanthraquinone and N,N-diethylaminopropylamine were successively reacted to cyanuric chloride, whereby Dispersant A3 of the following formula was obtained.

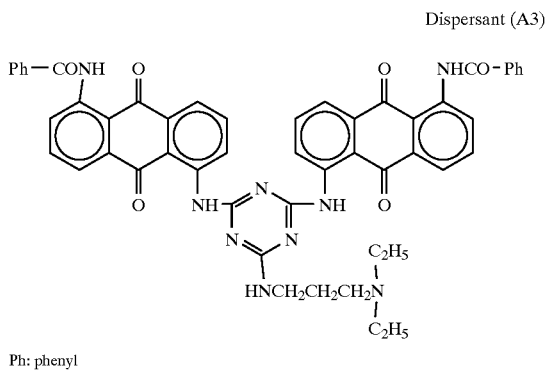

Dispersant (A3)

Ph: phenyl

Synthesis Example A4

In a similar manner as in Synthesis Example A1, 5-benzamido-1-aminoanthraquinone, aniline and N,N-diethylaminopropylamine were successively reacted to cyanuric chloride, whereby Dispersant A4 of the following formula was obtained.

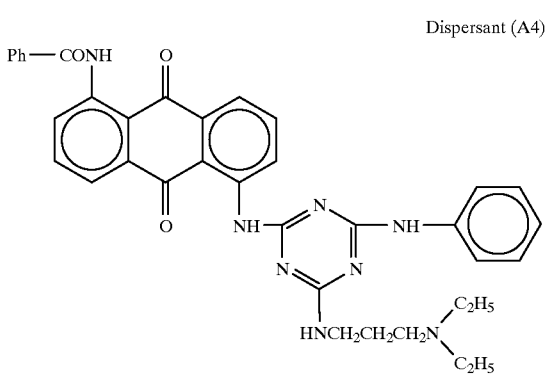

Dispersant (A4)

Synthesis Example A5

Dispersant A5 of the below-described formula was obtained by repeating similar procedures as in Synthesis Example A1 except that N-aminopropylmorpholine was used in place of N,N-dimethylaminopropylamine.

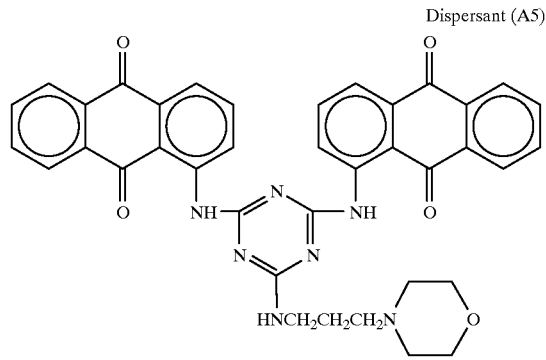

Dispersant (A5)

Synthesis Example A6

Dispersant A6 of the below-described formula was obtained by repeating similar procedures as in Synthesis Example A1 except that laurylaminopropylamine was used in lieu of N,N-dimethylaminopropylamine.

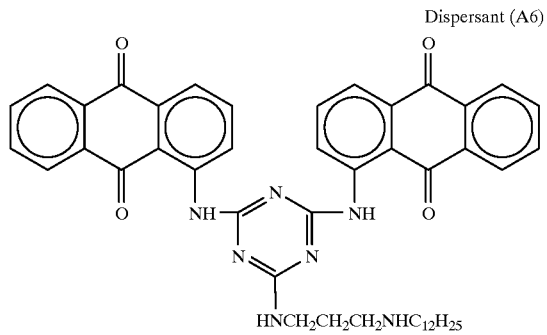

Dispersant (A6)

Synthesis Example A7

Dispersant A7 of the below-described formula was obtained by repeating similar procedures as in Synthesis Example A1 except that N-aminopropyl-4-pipecoline was used instead of N,N-dimethylaminopropylamine.

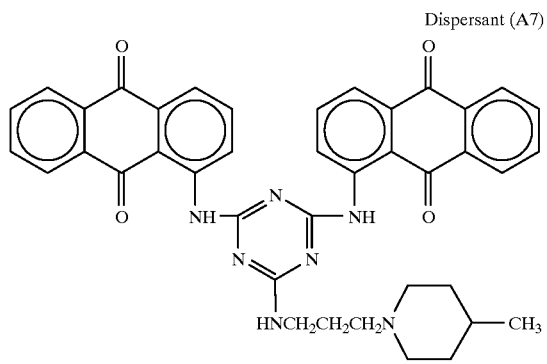

Dispersant (A7)

Synthesis Example A8

Dispersant A8 of the below-described formula was obtained by repeating similar procedures as in Synthesis Example A1 except that N,N-diethanolaminopropylamine was used in place of N,N-dimethylaminopropylamine.

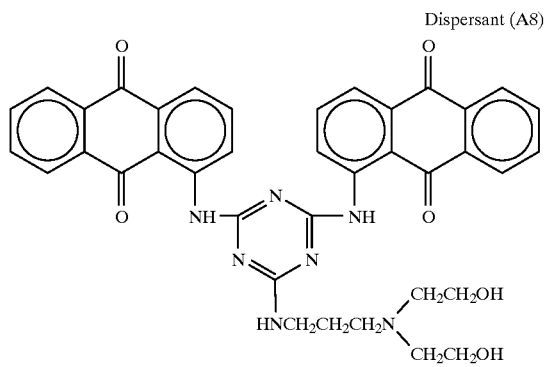

Dispersant (A8)

Example A1

Dispersant A1 and a solvent (propylene glycol monomethyl ether acetate; hereinafter abbreviated as "PGMAc") were added to an acrylic resin (obtained by polymerizing methacrylic acid, butyl acrylate, styrene and hydroxyethyl acrylate at a molar ratio of 25/50/15/10; molecular weight: 12,000; solid content: 30%) as shown below in Table 1. Subsequent to premixing, the resultant mixture was dispersed in a horizontal beads mill, whereby a green base color was obtained.

Examples A2–A3

In accordance with the corresponding compositions shown below in Table 1, two green base colors were obtained in a similar manner as in Example A1 except that Dispersants A2–A3 were used in place of Dispersant A1, respectively.

Examples A4–A7

Four kinds of red base colors were obtained by similar procedures as in Example A1 except that the anthraquinonyl red (P.R. 177) was used instead of the brominated phthalocyanine green and Dispersants A4–A7 were used as the dispersant, respectively. Their compositions are shown in Table 1.

Examples A8–A10

Yellow base colors were obtained by similar procedures as in Example A1 except that a yellow pigment, isoindoline (P.Y. 139), was used instead of the brominated phthalocyanine green and Dispersants A8,A1,A2 were used as the dispersant, respectively. Their compositions are shown in Table 1.

Comparative Example A1

In accordance with the corresponding composition shown below in Table 1, a green base color was obtained in a similar manner as in Example A1 except that a commercial dispersant (hereinafter abbreviated as "BD"), which is a derivative of a blue pigment, was used.

Comparative Example A2

In accordance with the corresponding composition shown below in Table 1, a red base color was obtained in a similar manner as in Example A4 except that a commercial dispersant (hereinafter abbreviated as "YD"), which is a derivative of a yellow pigment, was used.

Comparative Example A3

In accordance with the corresponding composition shown below in Table 1, a yellow base color was obtained in a similar manner as in Example A8 except that the commercial dispersant (hereinafter abbreviated as "YD"), which is the derivative of the yellow pigment, was used.

TABLE 1

Compositions of Examples A1–A10 and Comparative Examples A1–A3
(each value indicates the number of "parts")

|  | Example A | | | | | | | | | | Comparative Example A | | |
| --- | --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 | 3 |
| Hue | G | G | G | R | R | R | R | Y | Y | Y | G | R | Y |
| P.G. 36 | 20 | 20 | 20 | — | — | — | — | — | — | — | 20 | — | — |
| P.R. 177 | — | — | — | 20 | 20 | 20 | 20 | — | — | — | — | 20 | — |
| P.Y. 139 | — | — | — | — | — | — | — | 20 | 20 | 20 | — | — | 20 |
| Dispersant A | 2 | 2 | 2 | 2 | 2 | 2 | 2 | 2 | 2 | 2 | — | — | — |
| BD | — | — | — | — | — | — | — | — | — | — | 2 | — | — |
| YD | — | — | — | — | — | — | — | — | — | — | — | 2 | 2 |
| Acrylic resin | 50 | 50 | 50 | 50 | 50 | 50 | 50 | 50 | 50 | 50 | 50 | 50 | 50 |
| PGMAC | 28 | 28 | 28 | 28 | 28 | 28 | 28 | 28 | 28 | 28 | 28 | 28 | 28 |
| Total | 100 | 100 | 100 | 100 | 100 | 100 | 100 | 100 | 100 | 100 | 100 | 100 | 100 |

Example A11

The base colors of Examples A1–A10 and Comparative Examples A1–A3 were coated on glass substrates by a spinner, respectively. After drying, the maximum transmittance and maximum absorption wavelength of each coating were measured. Further, the base colors were stored at room temperature for one month, and their viscosity changes were measured. The results are shown in Table 2. Concerning the maximum transmittance of each of the red colors and yellow colors, the value shown in the table is the half of its transmittance at a wavelength of 650 nm.

TABLE 2

Light Transmission Characteristics and Storage Stability of Examples A1–A10 and Comparative Examples A1–A3

|  | Example A | | | | | | |
| --- | --- | --- | --- | --- | --- | --- | --- |
|  | 1 | 2 | 3 | 4 | 5 | 6 | 7 |
| Hue | G | G | G | R | R | R | R |
| Maximum absorption wavelength, nm | 540 | 540 | 540 | 601 | 597 | 599 | 599 |
| Maximum transmittance, % | 90.5 | 91.5 | 90.8 | 47.2 | 47.2 | 47.1 | 47.4 |
| Viscosity cp |  |  |  |  |  |  |  |
| Initial | 43 | 40 | 29 | 35 | 41 | 30 | 37 |
| One month later | 59 | 48 | 43 | 40 | 50 | 45 | 52 |

|  | Example A | | | Comparative Example A | | |
| --- | --- | --- | --- | --- | --- | --- |
|  | 8 | 9 | 10 | 1 | 2 | 3 |
| Hue | Y | Y | Y | G | R | Y |
| Naximum absorption wavelength, nm | 520 | 521 | 520 | 530 | 597 | 524 |
| Maximum transmittance, % | 45.4 | 46.1 | 46.1 | 92.8 | 46.6 | 46.0 |
| Viscosity cp |  |  |  |  |  |  |
| Initial | 49 | 54 | 48 | 61 | 89 | 62 |
| One month later | 60 | 72 | 74 | 83 | 103 | 194 |

Compared with the green base color of Comparative Example A1, the green base colors obtained in Examples A1–A3 were shifted toward a longer wavelength side in maximum transmission wavelength, were lower in viscosity, and had smaller viscosity increases after stored for one month. Compared with the red base color of Comparative Example A2 and the yellow base color of Comparative Example A3, respectively, the red base colors of Examples A4–A7 and the yellow base colors of Examples A8–A10 were significantly lower in viscosity both initially and one month later, although there was no substantial difference in hue.

Example A12

For the production of an RGB color filter, photosensitive R, G and B pigment dispersions were obtained in accordance with the corresponding compositions shown below in Table 3. The blue base color was prepared by using Cyanine Blue P.B. 15:6 and a commercially-available derivative of phthalocyanine blue in place of the cyanine green in Comparative Example A1.

TABLE 3

Compositions of Photosensitive R, G and B Pigment Dispersions
(each value indicates the number of "parts")

|  | R | G | B |
| --- | --- | --- | --- |
| R base color of Example A4 | 75 | — | — |
| G base color of Example A1 | — | 85 | — |
| Blue base color | — | — | 100 |
| Acrylic resin | 50 | 50 | 50 |
| Trimethylolpropane acrylate | 10 | 10 | 10 |
| 2-Hydroxy-2-methylpropiophenone | 2 | 2 | 2 |
| 2,2-Diethoxyacetophenone | 1 | 1 | 1 |
| PGMAc | 37 | 37 | 37 |
| Total | 200 | 200 | 200 |

A glass substrate, which had been treated with a silane coupling agent, was mounted on a spin coater, on which the above photosensitive R pigment dispersion for the color filter was spin-coated first at 300 rpm for 5 seconds and then at 1,200 rpm for 5 seconds. The thus-coated glass substrate was next prebaked at 80° C. for 10 minutes. A photomask of a mosaic pattern was brought into close contact with the prebaked coating, followed by exposure at a light quantity of 100 mJ/cm$^2$ under an extra-high pressure mercury vapor lamp. Development and washing were next conducted with an exclusive developer and an exclusive rinse, respectively, whereby a red mosaic pattern was formed on the glass substrate.

A green mosaic pattern and a blue mosaic pattern were then formed, respectively, from the above-described photosensitive G and B pigment dispersions for the color filter by conducting coating and baking in a similar manner as the above-described methods, so that the RGB color filter was obtained. The color filter so obtained had excellent spectral curve characteristics, was excellent in fastness such as light fastness and heat resistance, had excellent properties in light transmission too, and was equipped with superb properties as a color filter for use in a liquid crystal color display.

EXAMPLES DIRECTED TO DISPERSANTS B

Synthesis Example B1

2,4,6-Tris[anthraquinonyl(-1')-amino]-s-triazine (140 parts) was dissolved in 15 times its weight of 98% concentrated sulfuric acid, followed by the addition of 147 parts of paraformaldehyde and 96 parts of 2-chloroacetamide. The resultant mixture was subjected to a reaction at 80° C. for 5 hours. After the reaction, the reaction mixture was poured into a large amount of ice water. The resultant solid matter was collected by filtration and then washed with water. A portion of the thus-obtained paste was subjected to an elemental analysis, and as a result, 2.0 substituent groups were found to be introduced per molecule. The paste was next poured into 20 times its weight of water, to which 68 parts of N,N-dimethylaminopropylamine were added. The resultant mixture was subjected to a reaction at 70° C. for 3 hours. The resulting solid matter was collected by filtration, washed with water and then dried, whereby Dispersant B1 of the below-described formula was obtained. The dispersant so obtained was found to be soluble in acetic acid.

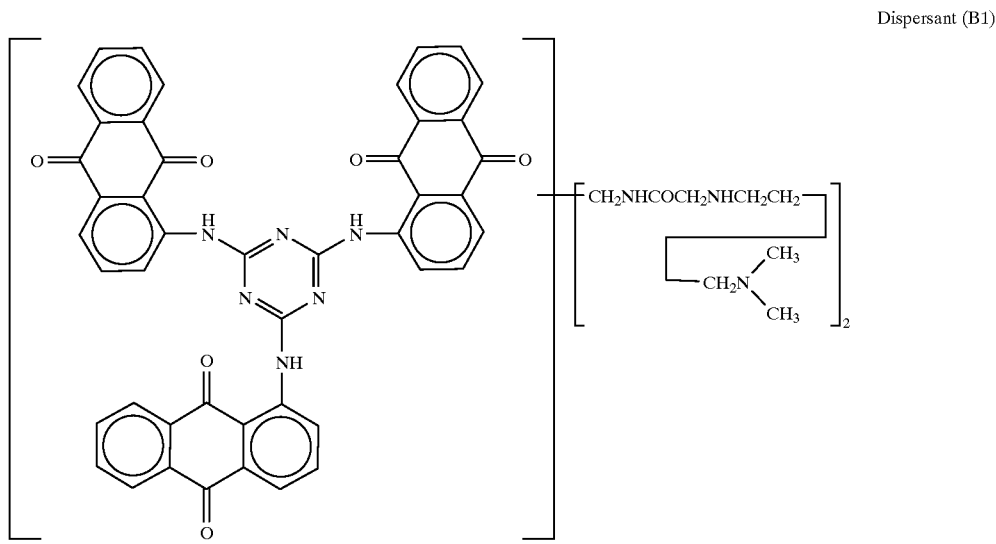

Dispersant (B1)

Synthesis Example B2

Dispersant B2 of the below-described formula was obtained by conducting similar reactions as in Synthesis Example B1 except for the use of 2,4-bis[anthraquinonyl(-1')-amino]-6-phenylamino-s-triazine. It was found to be soluble in acetic acid.

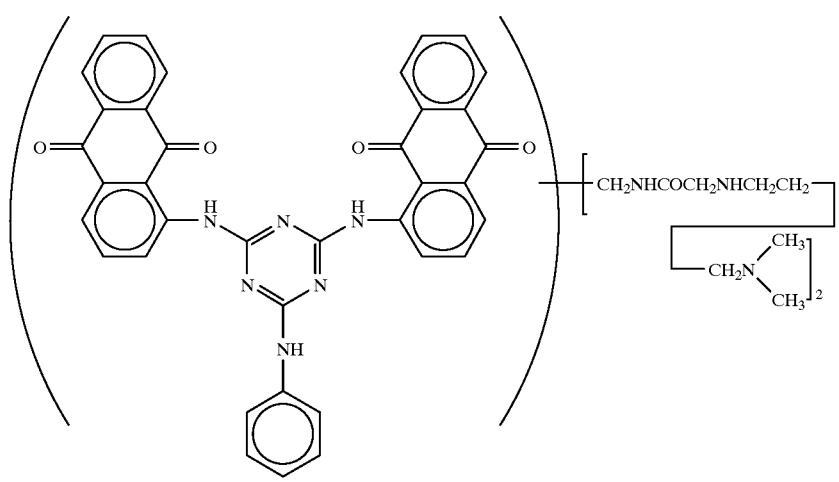

Dispersant (B2)

Synthesis Example B3

Dispersant B3 of the below-described formula was obtained by conducting similar reactions as in Synthesis Example B1 except for the use of 2,4,6-tris[5'-benzamidanthraquinonyl(-1')-amino]-s-triazine. It was found to be soluble in acetic acid.

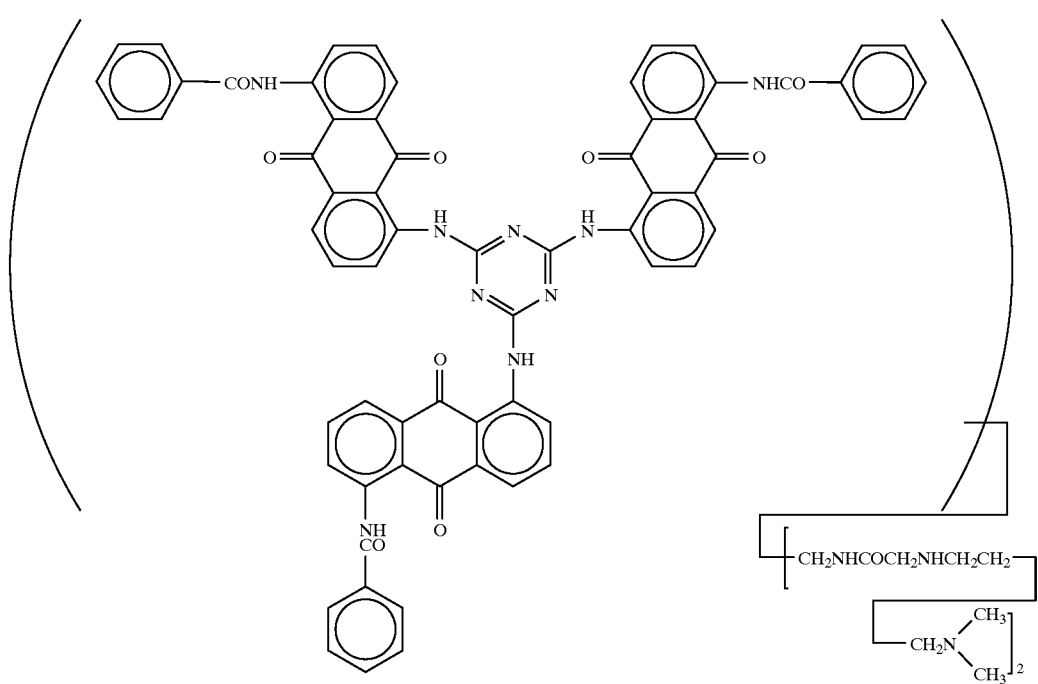

Dispersant (B3)

Synthesis Example B4

Dispersant B4 of the below-described formula was obtained by conducting similar reactions as in Synthesis Example B1 except for the use of 2,4-bis[5'-benzamidanthraquinonyl(-1')-amino]-6-phenylamino-s-triazine. It was found to be soluble in acetic acid.

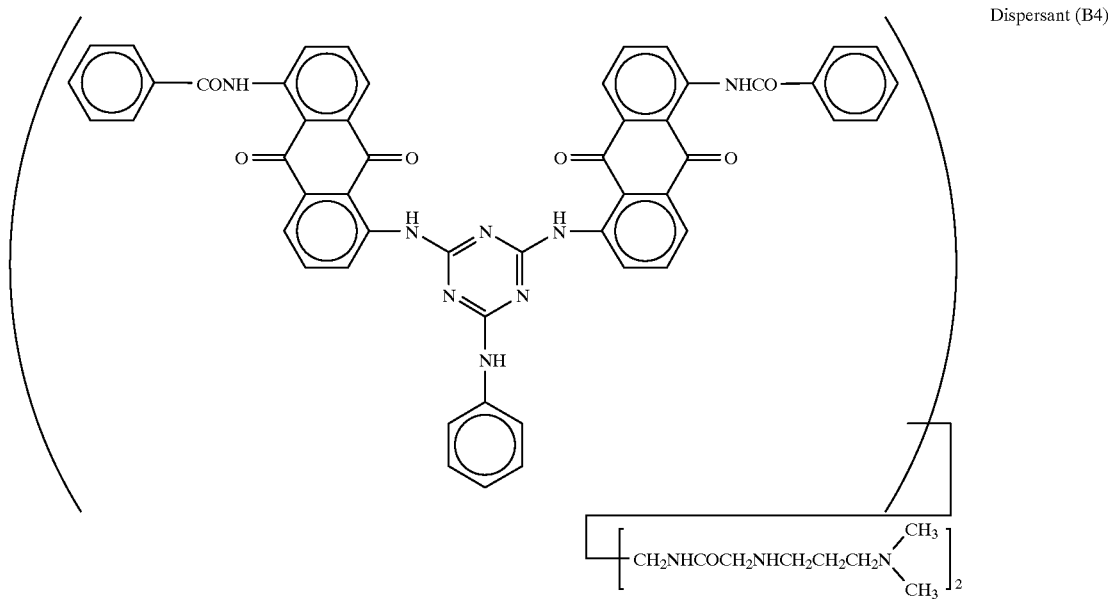

Dispersant (B4)

Synthesis Example B5

2,4-Bis[anthraquinonyl(-1')-amino]-6-chloro-s-triazine (80 parts) was dissolved in 1,600 parts of o-dichlorobenzene, followed by the addition of N,N-dimethylaminopropylamine in a molar mount 3 times as much as the triazine derivative. The resultant mixture was subjected to a reaction at 170° C. for 6 hours. After the reaction mixture was cooled, the resultant solid matter was collected by filtration, washed with alcohol and then dried. One hundred (100) parts of the thus-obtained yellow powder were dissolved in 15 times its weight of 98% concentrated sulfuric acid, followed by the addition of 40 parts of paraformaldehyde and 93 parts of monochloroacetamide. The resultant mixture was subjected to a reaction at 80° C. for 6 hours. After the reaction, the reaction mixture was poured into a large amount of ice water. The resultant solid matter was collected by filtration and then washed with water. A portion of the thus-obtained paste was subjected to an elemental analysis, and as a result, 2.0 substituent groups were found to be introduced per molecule. The paste was next poured into 20 times its weight of ice water, to which 110 parts of N,N-dimethylaminopropylamine were added. The resultant mixture was subjected to a reaction at 70° C. for 4 hours. The resulting solid matter was collected by filtration, washed with water and then dried, whereby Dispersant B5 of the below-described formula was obtained. The dispersant so obtained was found to be soluble in acetic acid.

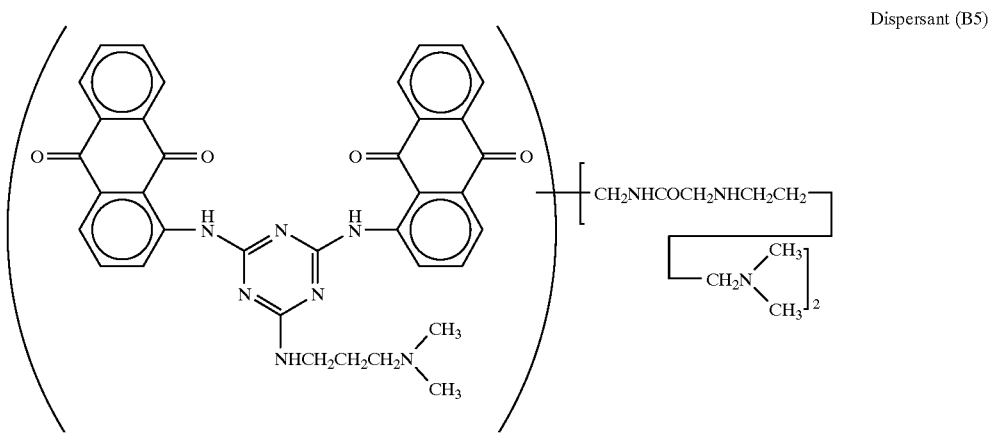

Dispersant (B5)

Synthesis Example B6

Dispersant B6 of the below-described formula was obtained by repeating similar procedures as in Synthesis Example B5 except for the use of 2,4-bis[5-benzamidanthraquinonyl(-1')-amino]-6-chloro-s-triazine. The thus-obtained dispersant was found to be soluble in acetic acid.

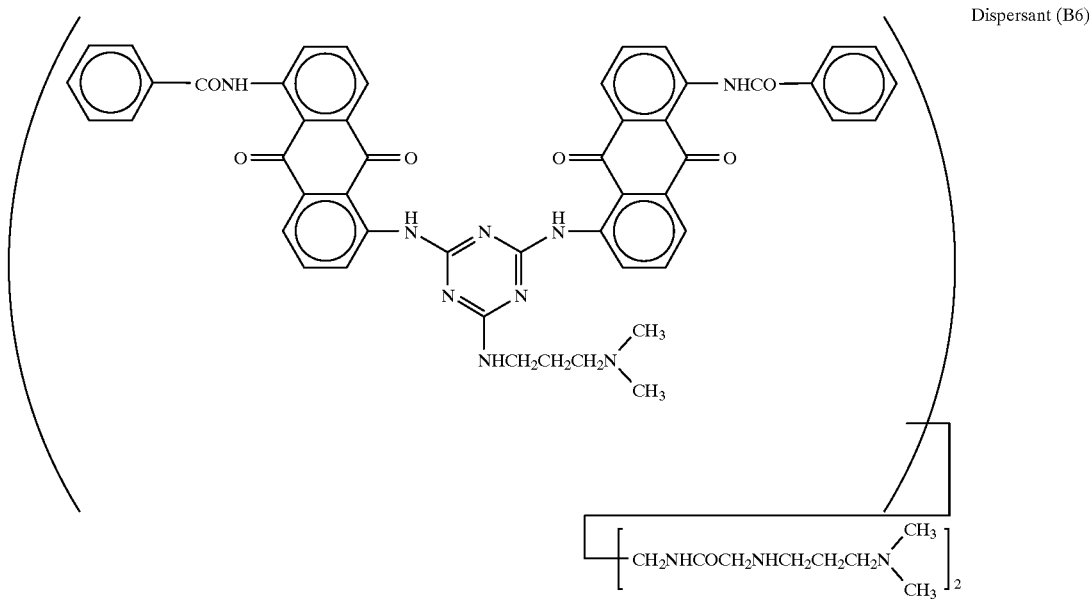

Dispersant (B6)

Synthesis Example B7

Eighty (80) parts of 2,4,6-tris[anthraquinonyl (–')-amino]-s-triazine were added at 20° C. or lower to a mixed solution consisting of 150 parts of 98% sulfuric acid and 200 parts of chlorosulfonic acid. Forty-five (45) parts of paraformaldehyde were added to the resultant mixture at 30° C. or lower, followed by stirring for 1 hour. The resultant mixture was stirred at 80° C. for 6 hours. After the reaction, the reaction mixture was poured into a large amount of ice water, and the resultant solid matter was collected by filtration and then washed with water. A portion of the thus-obtained paste was subjected to an elemental analysis, and as a result, 2.0 substituent groups were found to be introduced per molecule. The paste was next poured into 20 times its weight of water, to which 80 parts of N,N-dimethylaminopropylamine were added. The resultant mixture was subjected to a reaction at 70° C. for 4 hours. The resultant solid matter was collected by filtration, washed with water and then dried, whereby Dispersant B7 of the below-described formula was obtained. The thus-obtained dispersant was found to be soluble in acetic acid.

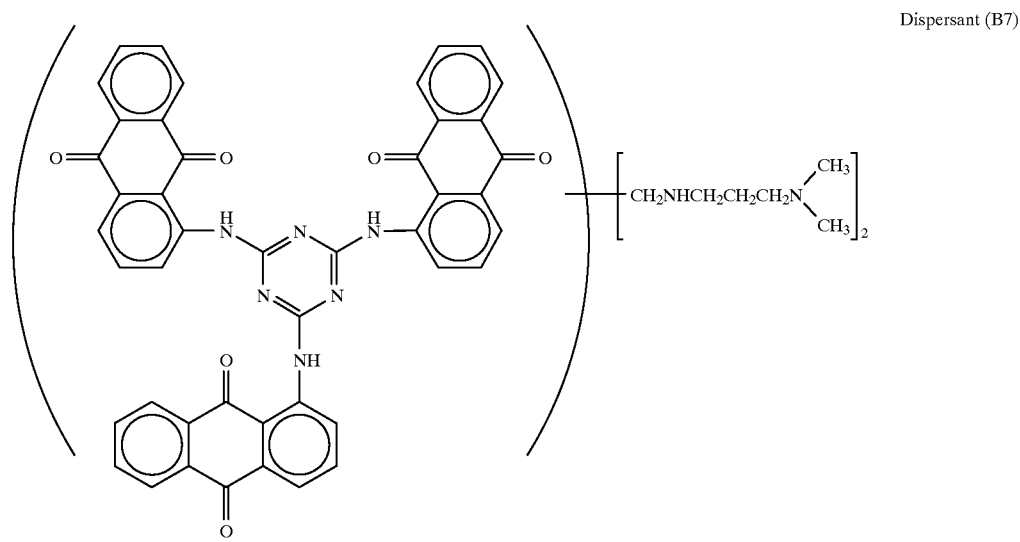

Dispersant (B7)

Synthesis Example B8

Dispersant B8 of the below-described formula was obtained by conducting similar reactions as in Synthesis Example B7 except for the use of 2,4-bis[anthraquinonyl(–1')-amino]-6-phenylamino-s-triazine. It was found to be soluble in acetic acid.

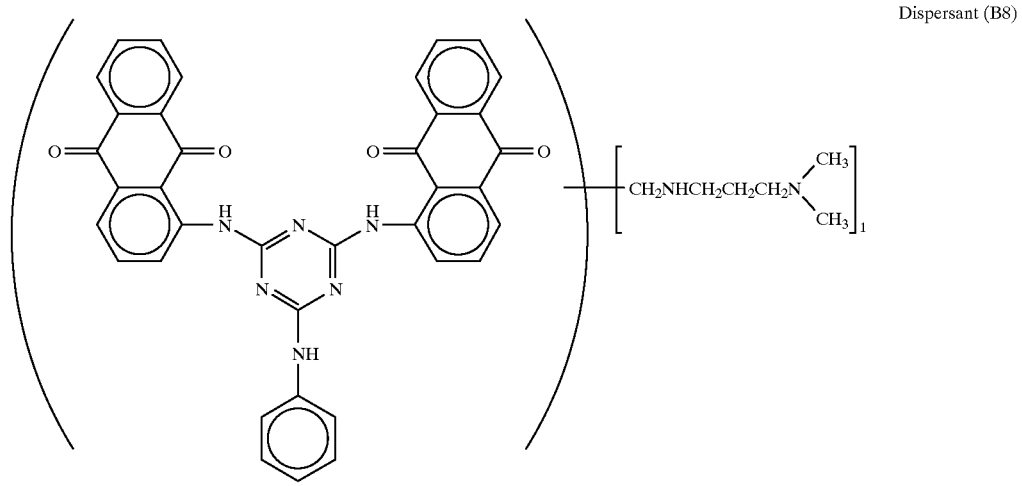

Dispersant (B8)

Example B1

Dispersant B1 and PGMAc were added to an acrylic resin (obtained by polymerizing methacrylic acid, butyl acrylate, styrene and hydroxyethyl acrylate at a molar ratio of 25/50/15/10; molecular weight: 12,000; solid content: 30%) as shown below in Table 4. Subsequent to premixing, the resultant mixture was dispersed in a horizontal beads mill, whereby a green base color was obtained.

Examples B2–B8

In accordance with the corresponding compositions shown below in Table 4, green base colors were obtained in a similar manner as in Example B1 except for the use of Dispersants B2–B8.

Example B9

A red base color was obtained by similar procedures as in Example B1 except that the anthraquinonyl red (P.R. 177) was used instead of the brominated phthalocyanine green. Its composition is shown in Table 4.

Example B10

A yellow base color was obtained by similar procedures as in Example B1 except that the yellow pigment, isoindoline (P.Y. 139), was used instead of the brominated phthalocyanine green. Its composition is shown in Table 4.

Comparative Example B1

In accordance with the corresponding composition shown below in Table 4, a green base color was obtained in a similar manner as in Example B1 except for the use of BD.

Comparative Example B2

In accordance with the corresponding composition shown below in Table 4, a green base color was obtained in a similar manner as in Example B7 except for the use of YD.

Comparative Example B3

In accordance with the corresponding composition shown below in Table 4, a green base color was obtained in a similar manner as in Example B1 except for the use of YD.

TABLE 4

Compositions of Examples B1–B10 and Comparative Examples B1–B3

| | Example B | | | | | | | | | | Comparative Example B | | |
|---|---|---|---|---|---|---|---|---|---|---|---|---|---|
| | 1 | 2 | 3 | 4 | 5 | 6 | 7 | 8 | 9 | 10 | 1 | 2 | 3 |
| Hue | G | G | G | G | G | G | G | G | R | Y | G | R | Y |
| P.G. 36 | 20 | 20 | 20 | 20 | 20 | 20 | 20 | 20 | — | — | 20 | — | — |
| P.R. 177 | — | — | — | — | — | — | — | — | 20 | — | — | 20 | — |
| P.Y. 139 | — | — | — | — | — | — | — | — | — | 20 | — | — | 20 |
| Dispersant B | 2 | 2 | 2 | 2 | 2 | 2 | 2 | 2 | 2 | 2 | — | — | — |
| BD | — | — | — | — | — | — | — | — | — | — | 2 | — | — |
| YD | — | — | — | — | — | — | — | — | — | — | — | 2 | 2 |
| Acrylic resin | 50 | 50 | 50 | 50 | 50 | 50 | 50 | 50 | 50 | 50 | 50 | 50 | 50 |
| PGMAc | 28 | 28 | 28 | 28 | 28 | 28 | 28 | 28 | 28 | 28 | 28 | 28 | 28 |
| Total | 100 | 100 | 100 | 100 | 100 | 100 | 100 | 100 | 100 | 100 | 100 | 100 | 100 |

Example B11

The base colors of Examples B1–B10 and Comparative Examples B1–B3 were coated on glass substrates by a spinner, respectively. After drying, the maximum transmittance and maximum absorption wavelength of each coating were measured. Further, the base colors were stored at room temperature for one month, and their viscosity changes were measured. The results are shown in Table 5. Concerning the maximum transmittance of each of the red color and yellow color, the value shown in the table is the half of its transmittance at a wavelength of 650 nm.

TABLE 5

Light Transmission Characteristics and Storage Stability
of Examples B1–B10 and Comparative Examples B1–B3

| | Example B | | | | | | |
|---|---|---|---|---|---|---|---|
| | 1 | 2 | 3 | 4 | 5 | 6 | 7 |
| Hue | G | G | G | G | G | G | G |
| Maximum absorption wavelength, nm | 541 | 540 | 540 | 538 | 542 | 538 | 537 |
| Maximum transmittance, % | 91.0 | 91.5 | 90.9 | 92.3 | 91.6 | 93.0 | 92.1 |
| Viscosity cp | | | | | | | |
| Initial | 29 | 32 | 27 | 35 | 25 | 31 | 40 |
| One month later | 39 | 38 | 35 | 40 | 29 | 40 | 54 |

| | Example B | | | Comparative Example B | | |
|---|---|---|---|---|---|---|
| | 8 | 9 | 10 | 1 | 2 | 3 |
| Hue | G | R | Y | G | R | Y |
| Maximum absorption wavelength, nm | 536 | 596 | 520 | 530 | 597 | 524 |
| Maximum transmittance, % | 93.2 | 47.1 | 45.8 | 92.8 | 46.6 | 46.0 |
| Initial Viscosity cp | 38 | 29 | 35 | 61 | 89 | 62 |
| One month later | 51 | 35 | 41 | 83 | 103 | 194 |

Compared with the green base color of Comparative Example B1, the green base colors obtained in Examples B1–B8 were shifted toward a longer wavelength side in maximum transmission wavelength, were lower in viscosity, and had smaller viscosity increases after stored for one month. Compared with the red base color of Comparative Example B2 and the yellow base color of Comparative Example B3, respectively, the red base color of Example B9 and the yellow base color of Examples B10 were significantly lower in viscosity both initially and one month later, although there was no substantial difference in hue.

Example B12

For the production of an RGB color filter, photosensitive R, G and B pigment dispersions were obtained in accordance with the corresponding compositions shown below in Table 6. The blue base color was prepared by using Cyanine Blue P.B. 15:6 and a commercially-available derivative of phthalocyanine blue in place of the cyanine green in Comparative Example B1.

TABLE 6

Compositions of Photosensitive
R, G and B Pigment Dispersions

| | R | G | B |
|---|---|---|---|
| R base color of Example B7 | 75 | — | — |
| G base color of Example B1 | — | 85 | — |
| Blue base color | — | — | 100 |
| Acrylic resin | 50 | 50 | 50 |
| Trimethylolpropane acrylate | 10 | 15 | 15 |
| 2-Hydroxy-2-methylpropiophenone | 2 | 2 | 2 |
| 2,2-Diethoxyacetophenone | 1 | 1 | 1 |
| PGMAc | 37 | 37 | 37 |
| Total | 200 | 200 | 200 |

A glass substrate, which had been treated with a silane coupling agent, was mounted on a spin coater, on which the above photosensitive R pigment dispersion for the color filter was spin-coated first at 300 rpm for 5 seconds and then at 1,200 rpm for 5 seconds. The thus-coated glass substrate was next prebaked at 80° C. for 10 minutes. A photomask of a mosaic pattern was brought into close contact with the prebaked coating, followed by exposure at a light quantity of 100 mJ/cm$^2$ under an extra-high pressure mercury vapor lamp. Development and washing were next conducted with an exclusive developer and an exclusive rinse, respectively, whereby a red mosaic pattern was formed on the glass substrate.

A green mosaic pattern and a blue mosaic pattern were then formed, respectively, from the above-described photosensitive G and B pigment dispersions for the color filter by conducting coating and baking in a similar manner as the above-described methods, so that the RGB color filter was obtained. The color filter so obtained had excellent spectral curve characteristics, was excellent in fastness such as light fastness and heat resistance, had excellent properties in light transmission too, and was equipped with superb properties as a color filter for use in a liquid crystal color display.

EXAMPLES DIRECTED TO OTHER APPLICATION FIELDS

Example C1

Ten (10) parts of Dispersant A1 were dissolved in 100 parts of an aqueous solution containing 5 parts of glacial acetic acid, and the thus-formed solution was added to a slurry of a yellow pigment (PY-110) (pigment content: 100 parts), followed by stirring for 60 minutes. Next, a 10% aqueous solution of sodium hydroxide was slowly added to adjust the pH of the system to 8.5. After the resultant solution was stirred for 30 minutes, the resultant solid matter was collected by filtration, washed, dried at 90° C. and then ground, whereby 108 parts of surface-treated yellow pigment powder were obtained.

When the pigment composition obtained as described above was dispersed in a commercial melamine/alkyd paint by a ball mill (pigment content: 15%), the resultant dispersion was low in viscosity and showed fluidity practically resembling a Newtonian flow. When a pale yellow paint was prepared by mixing this yellow paint with a commercially-available melamine/alkyd white pigment and was then stored for one week, it remained in a homogeneous state without color separation. As a comparative example, the yellow pigment (PY-110) which had not been subjected to surface treatment with Dispersant A1 was dispersed with the same composition, the resultant dispersion was high in viscosity and, when mixed with the white paint into a mixed paint, the yellow pigment underwent flocculation, resulting in occurrence of its separation and settlement.

Example C2

Eight (8) parts of Dispersant A1 were dissolved in 100 parts of an aqueous solution containing 5 parts of glacial acetic acid, and the thus-formed solution was added to a slurry of a yellow pigment (PY-154) (pigment content: 100 parts), followed by stirring for 60 minutes. Next, a 10% aqueous solution of sodium hydroxide was slowly added to adjust the pH of the system to 8.5. After the resultant solution was stirred for 30 minutes, the resultant solid matter was collected by filtration, washed, dried at 90° C. and then ground, whereby 105 parts of surface-treated yellow pigment powder were obtained.

The thus-obtained pigment composition was dispersed in a commercially-available acrylic lacquer by a beads mill, whereby a yellow paint having a pigment content of 13% was prepared. The paint was adjusted in viscosity with a lacquer thinner and spray-coated on an iron plate, whereby a yellow-colored, coated plate having a dry coating thickness of 32 μm was obtained. The coated plate was excellent in vividness and showed high gloss. For the sake of comparison, the yellow pigment (PY-154) which had not been subjected to surface treatment with Dispersant A2 was dispersed with the same composition and, subsequent to an adjustment in viscosity, the resultant dispersion was spray-coated to prepare a yellow-colored, coated plate. It was not smooth on the surface of the coating, and was low in gloss.

Example C3

A green paint having a total pigment content of 15% was prepared by adding Dispersant A3 in a proportion of 8% based on a green pigment (PG-7) upon dispersing the green pigment in the commercially-available melamine/alkyd paint. Compared with a paint not added with Dispersant A3, the thus-obtained paint had a somewhat yellowish hue but, when its fluidity was measured, had low viscosity and showed a flowing behavior close to a Newtonian flow. When Dispersant A3 was mixed with the commercially-available melamine/alkyd white paint and the resultant pale green paint was stored at 50° C. for 1 week, the paint with Dispersant A3 added therein was a homogeneous pale green paint, but in a paint prepared without Dispersant A3, the green pigment and the white pigment had undergone flocculation and a substantially clear liquid medium was observed as an upper layer in an upper part of the paint.

In the above description, the pigment dispersants according to the present invention were described based on the production examples of the color filters and the preparation examples of the paints as representative examples. The present invention is however not limited only to the production of color filters and the preparation paints, but the pigment dispersants according to the present invention are useful, for example, as dispersants for various pigments known to date. Accordingly, the pigment dispersants according to the present invention are also useful as dispersants for various pigments which are used in various paints other than those described above, various printing inks, various pigment printing agents, synthetic resin coloring agents, and the like.

We claim:

1. A pigment dispersant represented by the following formula (1):

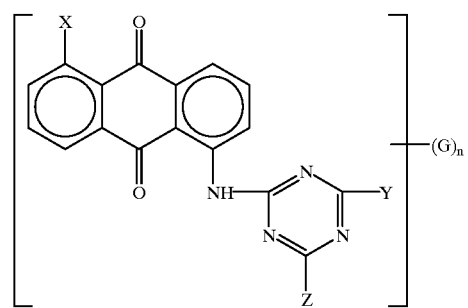

wherein X represents a hydrogen atom or an acylamino group; Y represents an anthraquinonylamino group having at its 5-position a hydrogen atom or an acylamino group, a phenylamino group or a phenoxy group; Z represents an anthraquinonylamino group having at its 5-position a hydrogen atom or an acylamino group, a phenylamino group, a phenoxy group or a $C_{2-30}$ aliphatic, alicyclic or heteroalicyclic amine reaction residual group having at least one amino group; G represents a reaction residual group of at least one compound selected from $C_{2-30}$ aliphatic, alicyclic and heteroalicyclic hydrocarbons each of which has at least one amino group; n is an integer of from 0 to 3; and when N stands for O, Z represents a reaction residual group of a $C_{2-30}$ aliphatic, alicyclic or heteroalicyclic polyamine having at least two amino groups.

2. A pigment dispersant according to claim 1, wherein n is O, and Z is a group represented by:

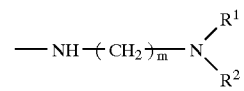

wherein $R^1$ and $R^2$ each independently represents a substituted or unsubstituted alkyl or cycloalkyl group or $R^1$ and $R^2$, together with the adjacent nitrogen atom, may form a heteroring optionally containing one or more nitrogen, oxygen or sulfur atoms, and m stands for an integer of from 2 to 30.

3. A pigment dispersant according to claim 1, wherein n is an integer of from 1 to 3, and Z is a group represented by:

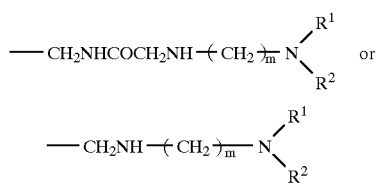

wherein $R^1$ and $R^2$ each independently represents a substituted or unsubstituted alkyl or cycloalkyl group or $R^1$ and $R^2$, together with the adjacent nitrogen atom, may form a heteroring optionally containing one or more nitrogen, oxygen or sulfur atoms, and m stands for an integer of from 2 to 30.

4. A pigment dispersion comprising a pigment, a dispersant, a film-forming resin dissolved in a liquid medium, wherein said pigment is a green pigment, a red pigment or a yellow pigment, and said dispersant is the dispersant defined in claim 1.

5. A pigment dispersion according to claim 4, wherein said pigment dispersant is contained in a proportion of 0.5 to 50 parts by weight per 100 parts by weight of said pigment.

6. A pigment dispersion according to claim 4, wherein said green pigment is C.I. Pigment Green 36, and said red pigment is C.I. Pigment Red 177.

7. A pigment dispersion according to claim 4, wherein said film-forming resin comprises a photosensitive resin.

8. A pigment dispersion according to claim 7, wherein said photosensitive resin comprises an acrylic resin containing free carboxylic groups in a molecule thereof.

9. A pigment dispersion according to claim 6, wherein said film-forming resin comprises a photosensitive resin.

10. A pigment dispersion according to claim 9 wherein the ratio of pigment to the film-forming resin in solution is 5 to 500 parts by weight of the pigment per 100 parts by weight of the film-forming resin and the pigment dispersant is present in an amount of 0.5 to 50 parts by weight per 100 parts by weight of the pigment.

11. A process for producing a color filter having a color pattern which comprises coating a transparent color filter substrate with a photosensitive pigment dispersion comprising a photopolymerization initiator and a pigment dispersion according to claim 7 and producing a color pattern for said color filter by exposing the coated substrate under a photomask and developing the exposed coating.

12. A process according to claim 11, wherein said green pigment is C.I. Pigment Green 36, and said red pigment is C.I. Pigment Red 177.

13. A color filter produced by the process defined in claim 11.

* * * * *